(12) United States Patent
Shveidel et al.

(10) Patent No.: US 11,249,656 B2
(45) Date of Patent: Feb. 15, 2022

(54) PERFORMANCE OPTIMIZATION FOR ACTIVE-ACTIVE LOCKING USING STICKING AFFINITY FOR STORAGE OBJECTS

(71) Applicant: EMC IP HOLDING COMPANY LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/520,510

(22) Filed: Jul. 24, 2019

(65) Prior Publication Data

US 2021/0026541 A1 Jan. 28, 2021

(51) Int. Cl.
*G06F 3/06* (2006.01)
*G06F 13/16* (2006.01)

(52) U.S. Cl.
CPC ............ *G06F 3/0622* (2013.01); *G06F 3/061* (2013.01); *G06F 3/0638* (2013.01); *G06F 3/0683* (2013.01); *G06F 13/1689* (2013.01)

(58) Field of Classification Search
CPC ...... G06F 3/061; G06F 3/0622; G06F 3/0638; G06F 3/0683; G06F 13/1689
See application file for complete search history.

(56) References Cited

U.S. PATENT DOCUMENTS

| 5,305,448 A * | 4/1994 | Insalaco | G06F 9/52 711/164 |
| 6,247,099 B1 * | 6/2001 | Skazinski | G06F 12/0815 711/117 |
| 8,578,126 B1 * | 11/2013 | Gaonkar | G06F 3/064 711/201 |
| 2006/0173851 A1 * | 8/2006 | Singh | G06F 21/6218 |
| 2007/0016754 A1 * | 1/2007 | Testardi | G06F 3/0635 711/206 |
| 2009/0063411 A1 * | 3/2009 | Bish | G06F 16/27 |
| 2018/0129611 A1 * | 5/2018 | Parker | G06F 12/1009 |
| 2020/0133773 A1 * | 4/2020 | Lingarajappa | G06F 3/067 |

* cited by examiner

*Primary Examiner* — Eric T Oberly
(74) *Attorney, Agent, or Firm* — Daly, Crowley, Mofford & Durkee, LLP

(57) ABSTRACT

A method for use in a storage system, the method comprising: receiving, at a first storage processor in the plurality, an Input/Output (I/O) request that is associated with a storage object; identifying an entity associated with the I/O request and the storage object; detecting, by the first storage processor, whether the first storage processor is a current owner of the storage object; when the first storage processor is the current owner of the storage object, setting a lock on the entity, the lock being set by the first storage processor, the lock being set independently of any other storage processors in the storage system; when the first storage processor is not the current owner of the storage object, setting the lock in cooperation with the current owner of the storage object; and executing the I/O request based on the entity after the lock has been set.

20 Claims, 6 Drawing Sheets

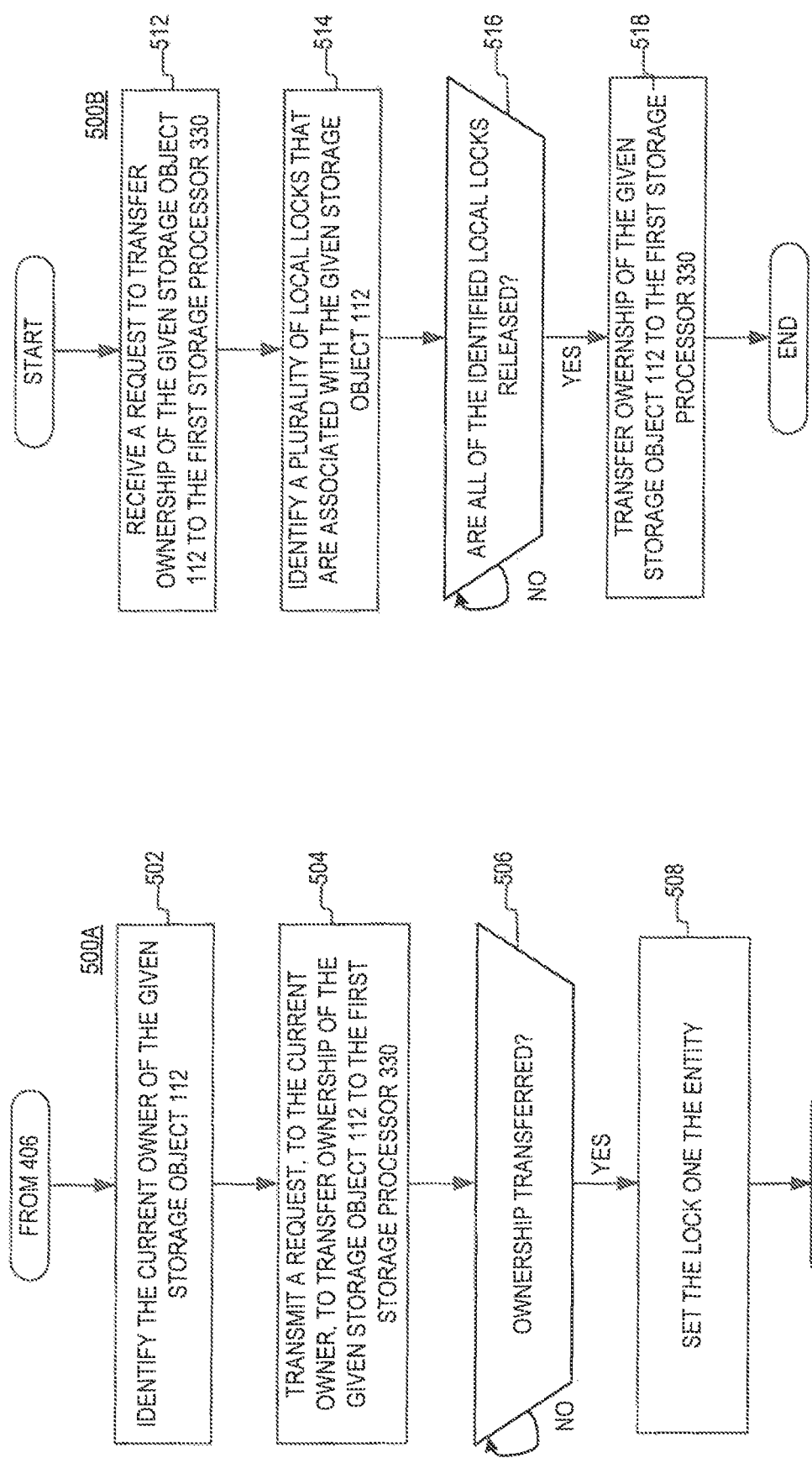

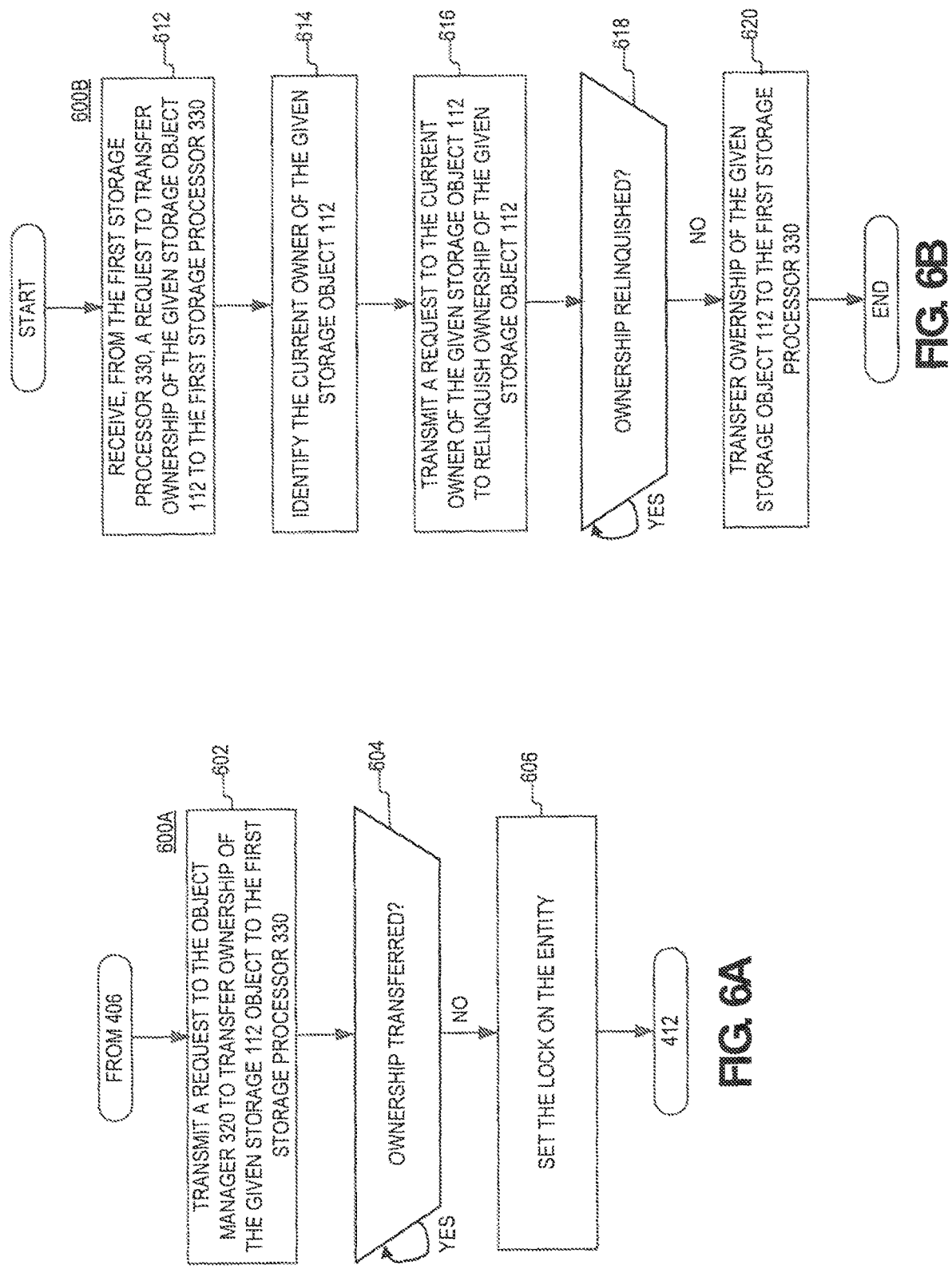

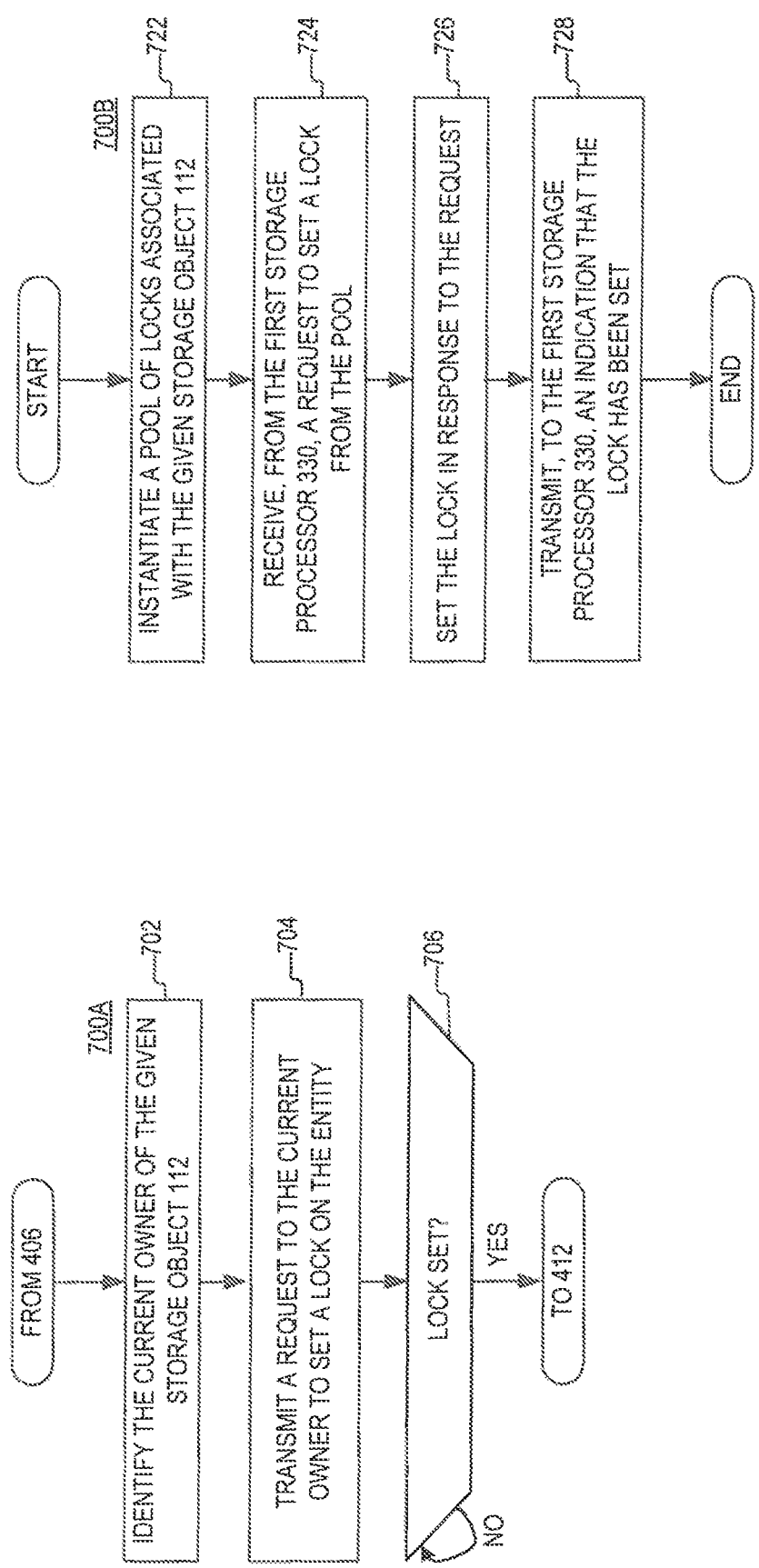

PERFORMANCE OPTIMIZATION FOR ACTIVE-ACTIVE LOCKING USING STICKING AFFINITY FOR STORAGE OBJECTS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage system having a plurality of storage processors, the method comprising: receiving, at a first storage processor in the plurality, an Input/Output (I/O) request that is associated with a storage object; identifying an entity associated with the I/O request and the storage object; detecting, by the first storage processor, whether the first storage processor is a current owner of the storage object; when the first storage processor is the current owner of the storage object, setting a lock on the entity, the lock being set by the first storage processor, the lock being set independently of any other storage processors in the plurality; when the first storage processor is not the current owner of the storage object, setting the lock in cooperation with the current owner of the storage object; and executing the I/O request based on the entity after the lock has been set.

According to aspects of the disclosure, a storage processor is disclosed for use in a storage system, the storage processor comprising: a memory; and a processing circuitry, operatively coupled to the memory, the processing circuitry being configured to perform the operations of: receiving an Input/Output (I/O) request that is associated with a storage object; identifying an entity associated with the I/O request and the storage object; detecting whether the storage processor is a current owner of the storage object; when the storage processor is the current owner of the storage object, a lock on the entity, the lock being set independently of any other storage processors in the storage system; when the storage processor is not the current owner of the storage object, setting the lock in cooperation with the current owner of the storage object; and executing the I/O request based on the entity after the lock has been set.

According to aspects of the disclosure, a non-transitory computer-readable medium storing one or more processor-executable instructions, which, when executed by a processing circuitry of a first storage processor in a storage system, cause the processing circuitry to perform the operations of: receiving, by the first storage processor, an Input/Output (I/O) request that is associated with a storage object; identifying an entity associated with the I/O request; detecting, by the first storage processor, whether the first storage processor is a current owner of the storage object; when the first storage processor is the current owner of the storage object, setting a lock on the entity, the lock being set independently of any other storage processors in the storage system; when the first storage processor is not the current owner of the storage object, setting the lock in cooperation with the current owner of the storage object; and executing the I/O request based on the entity after the lock on the entity has been set.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5A is a flowchart of an example of a process, according to aspects of the disclosure;

FIG. 5B is a flowchart of an example of a process, according to aspects of the disclosure;

FIG. 6A is a flowchart of an example of a process, according to aspects of the disclosure;

FIG. 6B is a flowchart of an example of a process, according to aspects of the disclosure;

FIG. 7A is a flowchart of an example of a process, according to aspects of the disclosure;

FIG. 7B is a flowchart of an example of a process, according to aspects of the disclosure; and

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
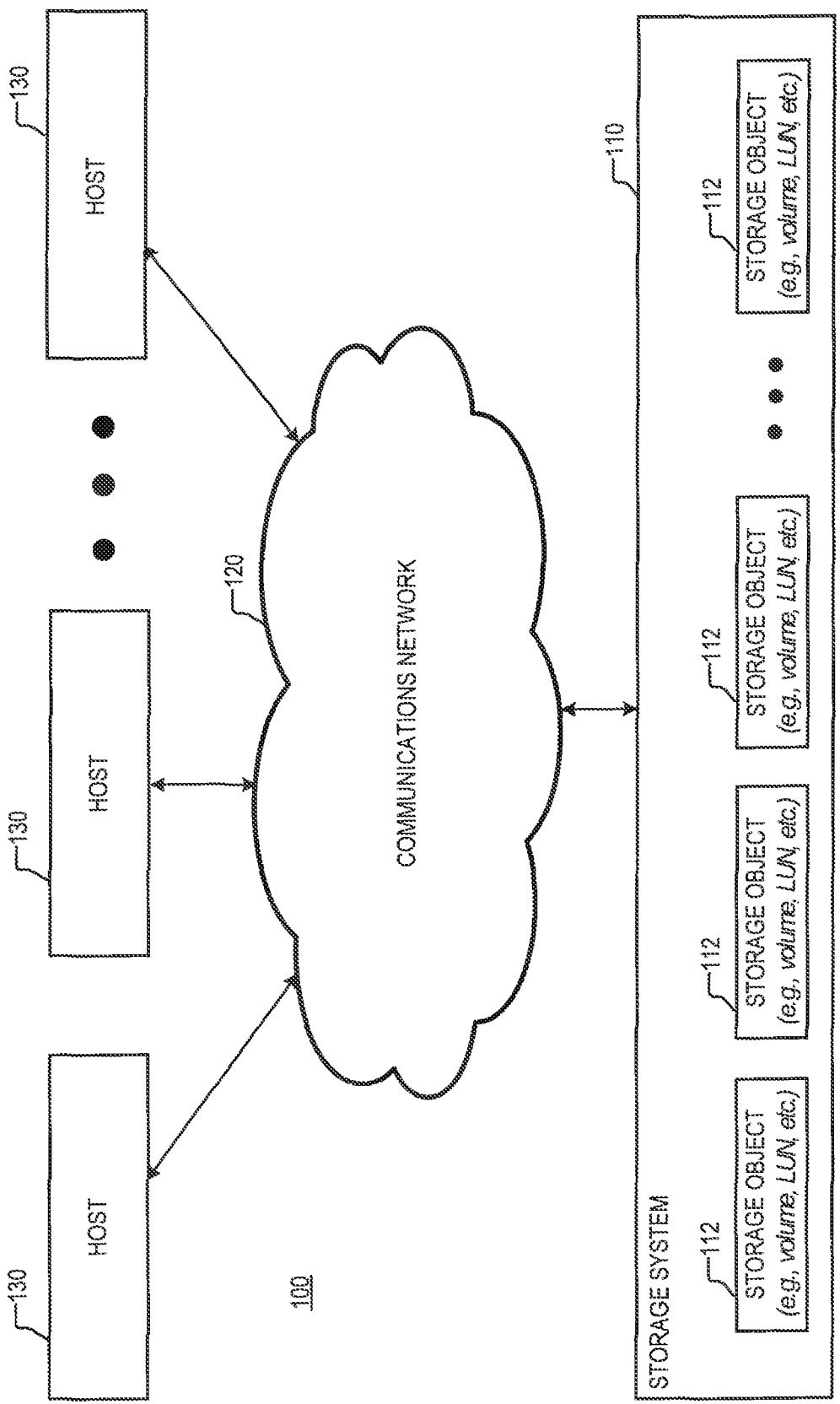
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device. The storage system 110 may include a midrange storage system, an enterprise storage system, and/or any other suitable type of storage system.

Figure 2:
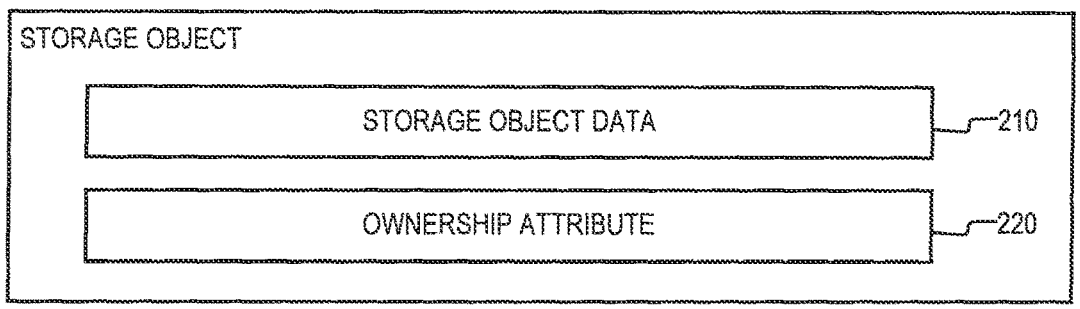
FIG. 2 is a diagram of an example of a storage object, according to aspects of the disclosure.

The storage system 110 may store a plurality of storage objects 112. Any of the storage objects 112 may include a data volume, a logical unit, a file system, and/or any other suitable type of storage object. As illustrated in FIG. 2, each storage object 112 may include storage object data 210 and an ownership attribute 220 that are integrated directly into the storage object 112. The storage object data 210 may include any suitable type of data that is included in a storage object, such as metadata (e.g., i-node metadata, directory metadata, mapping metadata, etc.) and/or user data. The ownership attribute 220 may include any suitable type of number, string, or alphanumerical string, that identifies one of the plurality of storage processors 330 (shown in FIG. 3A) as the current owner of the storage object. In some implementations, each of the plurality of storage objects may have only one owner at any given time.

Figure 3A:
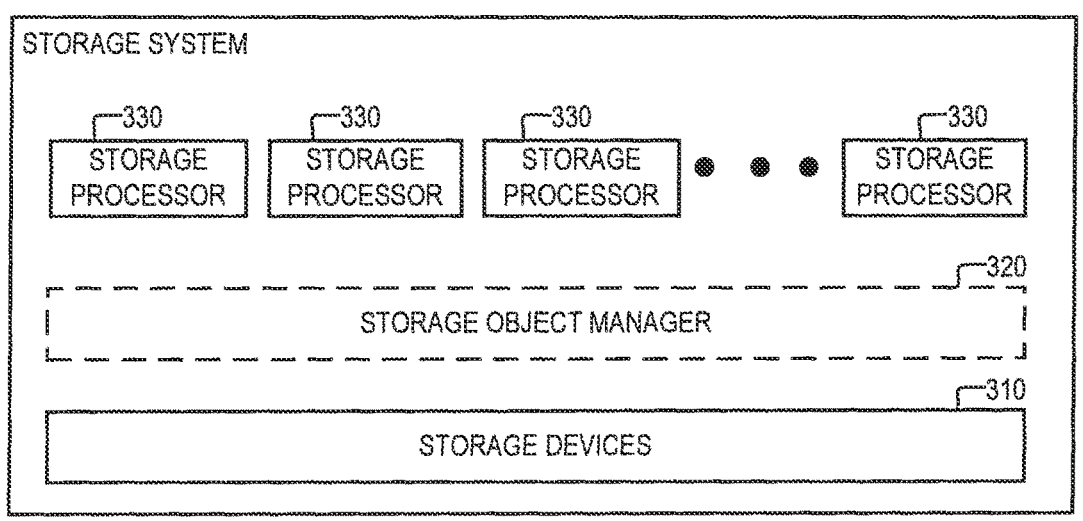
FIG. 3A is a diagram of a storage system that is part of the system of FIG. 1, according to aspects of the disclosure.

FIG. 3A is a diagram of the storage system 110, according to aspects of the disclosure. As illustrated, the storage system 110 may include one or more storage devices 310, a storage object manager 320, and a plurality of storage processors 330. The storage devices 310 may include one or more of a non-volatile Random-Access Memory (nvRAM), a Solid State Drive (SSD), a Hard Drive, a flash memory, and/or any other suitable type of storage device. The storage object manager 320 may be optionally included in the storage system 110. As is further discussed below with respect to FIG. 6B, the storage object manager 320 may be configured to perform tasks related to the transfer of ownership of the storage objects 112. Each of the storage processor 330 may include any suitable type of computing device, such as a storage server, a desktop computer, a laptop, etc. One possible implementation of any of the storage processors 330 is discussed further below with respect to FIG. 3B.

Figure 3B:
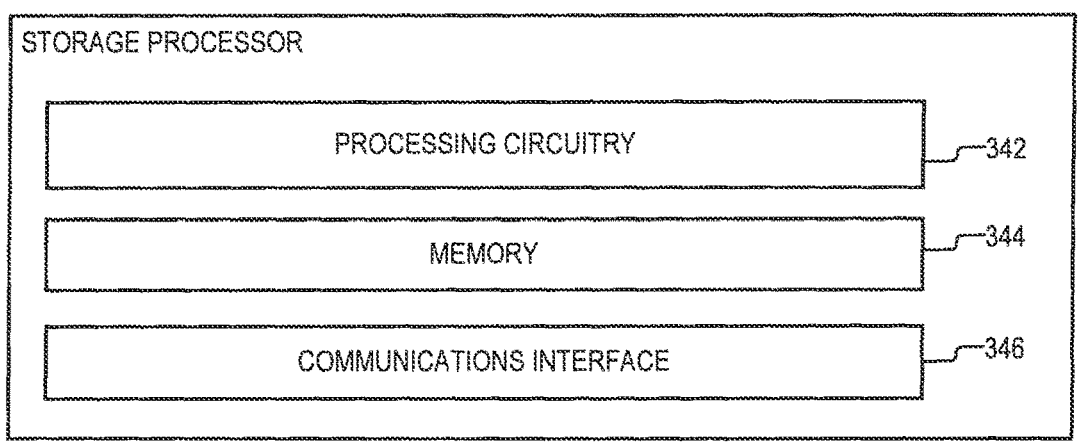
FIG. 3B is a diagram of an example of a storage processor, according to aspects of the disclosure.

FIG. 3B is a diagram of an example of a storage processor 330, according to aspects of the disclosure. As illustrated, the storage processor 330 may include a processing circuitry 342, a memory 344, and a communications interface 346. The processing circuitry 342 may include at least one of a general-purpose processor (e.g., a RISC processor or an x86 processor), a Field Programmable Gate Array (FPGA), an Application Specific Integrated Circuit (ASIC), and/or any other suitable type of processing circuitry. The memory 344 may include any suitable type of volatile and/or non-volatile memory such as a Solid-State Drive (SSD), random-access memory (RAM), read-only memory (ROM), flash memory, EEPROM memory, Dynamic Random-Access Memory (DRAM) and/or any other suitable type of memory. The communications interface 346 may include one or more of an InfiniBand interface, an Ethernet interface, an 802.11 (WiFi) interface, a Bluetooth interface, and/or any other suitable type of interface. Although not shown, the storage processor 330 may include any suitable type of I/O device (e.g., a keyboard, a displace, a mouse, etc.), an uninterruptable power supply (UPS), and/or any other component that is normally found in storage processors.

The operation of the storage system 110 is now discussed in further detail. In operation, each of the storage processors 330 may store a local copy of the storage objects 112 in the storage processor's memory 344. When the ownership of a given storage object 112 is changed, each of the storage processors 330 may receive a notification that identifies the new owner of the given storage object 112. In response, each of the storage processors 330 may change the ownership attribute 220 of its local copy of the given storage object to identify the new owner of the given storage object 112. In this way, the ownership of each of the storage objects 112 may be consistently maintained across the entire set of local copies of the storage objects 112 that are instantiated at different storage processors 330 in the storage system 110.

In some implementations, the ownership of storage objects may determine the way in which locks are obtained on entities associated with the storage objects. Such entities may include metadata pages that are associated with the storage objects or one or more addresses associated with the storage objects. As used throughout the disclosure, the term "lock" may refer to any suitable type of synchronization object (or variable) that is used, at least in part, to control access to an entity. According to the present disclosure, the phrase "setting a lock on an entity" may refer to transitioning the lock associated with the entity from a first state to a second state. The first state may be one in which a storage processor is not permitted (by the lock) to access the entity. The second state may be one in which the storage processor is permitted (by the lock) to access the entity. According to the present disclosure, the phrase "releasing the lock" may refer to transitioning the lock from the second state back to the first state. According to the present disclosure, the phrase "entity associated with the storage object" may include one or more of "a portion of the storage object, a page of metadata that is referenced by the storage object, a logical block address (LBA) in the storage object (when the storage object is a volume or a logical unit), a file (when the storage object is a file system), a physical address associated with the storage object, and/or any other suitable type of entity. In some implementations, a page of metadata that is associated with a storage object and an I/O request may include any suitable type of data that is necessary for identifying a physical address in a storage device where data associated with the I/O request has to be written to or read from.

In some implementations, when an I/O is received at a respective storage processor 330, the respective storage processor 330 may identify a storage object 112 that is associated with the I/O request. Next, the respective storage processors may identify an entity associated with the I/O request and the given storage object 112. The entity may include a metadata page, an address, and/or any other suitable type of entity. Next, the respective storage processor may retrieve the ownership attribute 220 of the identified storage object 112. Next, the respective storage processor 330 may determine (based on the retrieved ownership attribute 220) whether it is the current owner of the identified storage object 112. If the respective storage processor 330 is the current owner of the identified storage object, the respective storage processor may obtain the lock independently of any other storage processors in the storage system. Otherwise, if the respective storage processor 330 is not the current owner of the storage object, the respective storage processor may obtain the lock in cooperation with the current owner of the identified storage object 112. And finally, after a lock has been placed on the entity, the respective storage processor 330 may use the entity to fulfill the I/O request.

In some implementations, when a lock is set on an entity, by a storage processor, "without interacting with other storage processors," no requests are transmitted to the other storage processor for the purposes of obtaining the lock, and the procurement of the lock is not conditional on any action by the other storage processor. By contrast, when the lock on the entity is set, by the storage processor, "in cooperation with the current owner of a storage object associated with the entity," a request is transmitted to the current owner of a storage object (associated with the entity), and the procurement of the lock is conditional the request being fulfilled. As is further discussed below, in some implementations, the request may be a request to transfer ownership of the storage object or a request to set the lock remotely on behalf of the storage processor.

In some implementations, each of the host devices 130 may support a smart-routing protocol, such as Asymmetric Logical Unit Assignment (ALUA). A smart routing protocol, according to the present disclosure, may be any protocol that permits I/O requests for any particular storage object 112 to be routed (most of the time) to the same storage processor 330. In this regard, each of the host devices 130 (or their associated networking infrastructure) may maintain a map that associates each of the storage objects 112 with corresponding storage processor. In operation, when accessing a particular storage object 112, any of the host devices 130 (or their associated networking infrastructure), may use the map to identify the storage object's 112 corresponding storage processor 330, and transmit I/O requests to that storage processor only (or mostly). As used throughout the disclosure, the term "I/O request" may refer to a read request, a write request, and/or any other suitable type of request.

In some respects, the use of smart routing may result in the owner of each storage object 112 receiving most I/O requests for this storage object. As a result, most I/O requests for any given one of the storage objects 112 may be executed by the given storage object's owner. As noted above, when an I/O request is received at the owner of the corresponding storage object, the owner of that storage object would be able to obtain locks on (at least some) entities associated with the storage object independently of other storage nodes. Obtaining the lock independently of other storage nodes can increase the speed efficiency and latency at which I/O requests are serviced by the storage system 110.

In some respects, the use of an ownership attribute of a storage object to obtain locks on entities associated with the storage object may do away with the need to use shared locks in order to access the entities. A shared lock may be one that is accessed by multiple storage processors. The use of shared locks normally generates a large amount of inter-processor network traffic (and CPU usage), as any given storage processor is required to notify the other storage processors, which share the lock, when the given processor wants to set/release the lock. By contrast, in some implementations, each (or at least some) of the locks discussed further below with respect to FIGS. 4-7B may be local locks that are set/released by only one storage processor (i.e., the current owner of a particular storage object). Because each of these locks are accessed (e.g., set and/or released) by only one storage processor (i.e., the current owner of a storage object associated with an entity for which the lock is set), that storage processor does not need to inform other storage processors (with the exception of a requestor of a lock, in some implementations) when a particular lock is set, which in turn could result in (i) an increase of the speed at which the lock can be set, and (ii) a reduction in the amount of inter-processor network traffic (and CPU usage) that is generated when the lock is set.

According to the present example, the smart routing protocol is implemented by the host devices 130. However, alternative implementations are possible in which the smart routing protocol is implemented at a frontend of the storage system 110. In such implementations, when an I/O request is received at the frontend, the frontend may identify a storage object associated with the request and the owner of the storage object, after which the frontend may route the I/O requests to the storage object.

Figure 4:
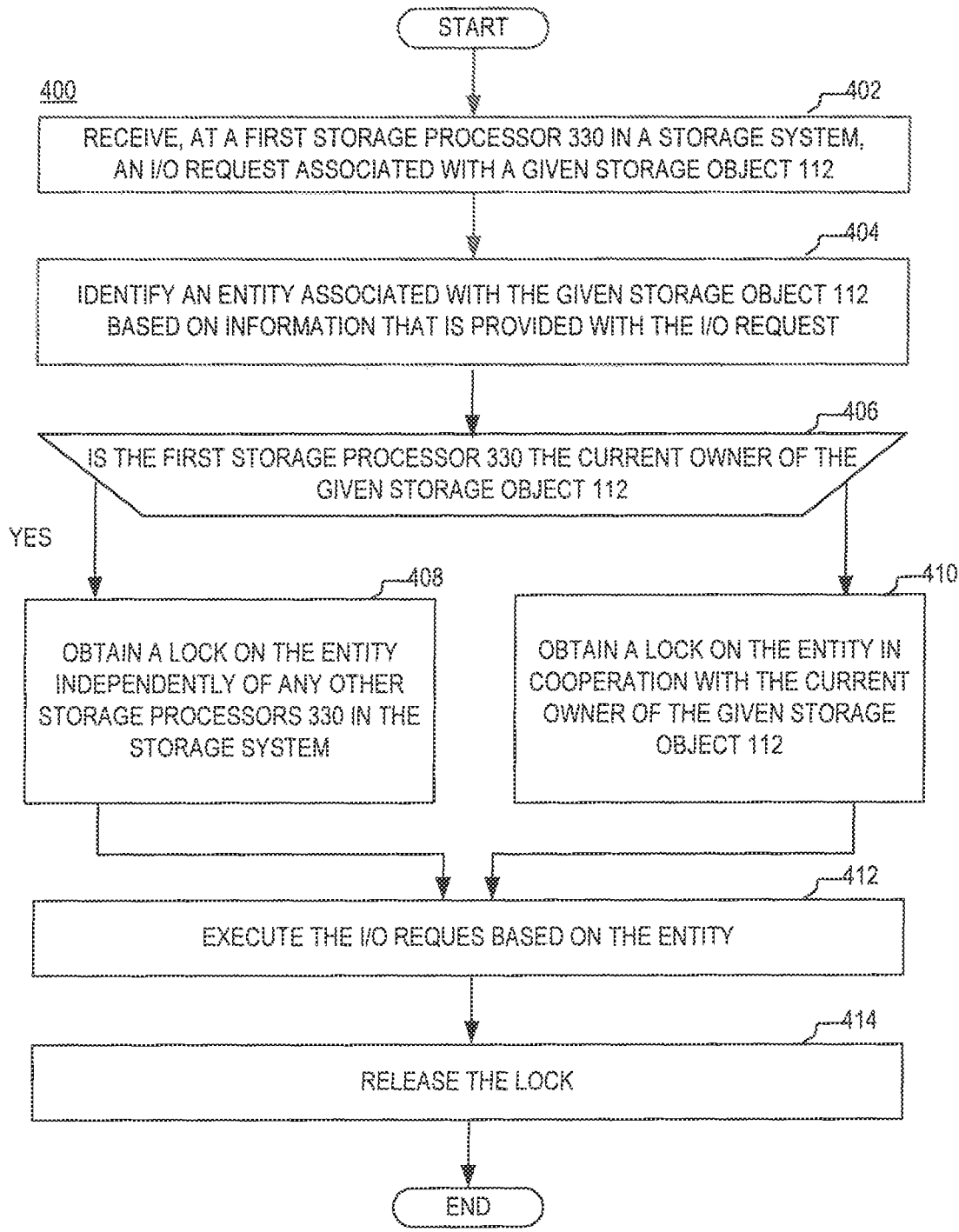
FIG. 4 is a flowchart of an example of a process, according to aspects of the disclosure.

FIG. 4 is a flowchart of an example of a process 400 for executing an I/O request, according to aspects of the disclosure. At step 402, a first storage processor 330 receives an I/O request that is associated with a given storage object 112 in the storage system 110. At step 404, the first storage processor 330 identifies an entity associated with the given storage object 112 and with the I/O request. At step 406, the first storage processor 330 detects whether it is the current owner of the given storage object 112. In some implementations, detecting whether the first storage processor 330 is the current owner of the given storage object 112 may include retrieving the ownership attribute 220 of the given storage object 112 and determining whether an ownership attribute 220 of the storage object includes an identifier corresponding to the first storage processor 330. If the first storage processor 330 is the current owner of the given storage object 112, the process 400 proceeds to step 408. If the first storage processor 330 is not the current owner of the given storage object 112, the process 400 proceeds to step 410. At step 406, the storage processor sets a lock on the entity (identified at step 404) independently of any of the other storage processors 330. At step 408, the first storage processor 330 sets the lock on the entity in cooperation with the current owner of the given storage object 112. The second storage processor 330 is the current owner of given storage object 112 (i.e., the owner of the given storage object 112 at the time when the I/O request is received at step 402). The manner in which step 410 is performed is discussed further below with respect to FIGS. 5A-B, 6A-B, and 7A-B. At step 412, after a lock is set on the entity, the storage processor 330 executes the I/O request. At step 414, the storage processor 330 releases the lock on the entity.

In some implementations, the entity may include a metadata page that maps an LBA (provided in the I/O request) to a corresponding physical address. In such implementations, executing the I/O request based on the entity may include using the metadata page to retrieve the physical address and writing or reading data from the physical address. Additionally or alternatively, in some implementations, the entity may be an LBA that is provided in the I/O request. In such implementations, executing the I/O request based on the entity may include writing or reading from the LBA.

FIGS. 5A-B provide an example of a protocol for cooperatively setting a lock on an entity that is associated with a storage object, as specified by step 410 of the process 400. Shown in FIG. 5A is a process 500A that is performed by the first storage processor 330 for the purposes of setting a lock on the entity identified at step 404. Shown in FIG. 5B is a process 500B that is performed by the second storage processor 330 for the purposes of setting a lock on the entity identified at step 404. According to the present example, the processes 500A and 500B are executed (at least in part) concurrently with one another.

Turning to process 500A, at step 502, the first storage processor 330 detects that the second storage processor 330 is the current owner of the given storage object. In some implementations, the first storage processor 330 may detect that the second storage processor 330 is the current owner of the given storage object 112 by retrieving and examining the ownership attribute 220 of the given storage object 112. At step 504, the first storage processor 330 transmits a request to the second storage processor 330 to transfer ownership of the given storage object 112 to the first storage object. At step 506, the first storage processor 330 waits until ownership of the storage object 330 has been transferred to the first storage processor 330. At step 508, after ownership of the first storage object has been transferred to the first storage processor 330, the first storage processor 330 sets the lock on the entity.

Turning to process 500B, at step 512, the second storage processor 330 receives the request to transfer ownership of the given storage object 112 to the first storage processor 330. At step 514, the second storage processor 330 identifies a plurality of locks that have been placed on the given storage object. At step 516, the second storage processor 330 determines if all of the identified locks are released. If all locks have been released, the process 500B proceeds to step 518. Otherwise, if at least one of the locks is set, step 516 is repeated. At step 518, the second storage processor 330 transfers ownership of the given storage object 112 to the first storage processor 330.

In some implementations, each of the locks discussed with respect to steps 512-518 may be instantiated on the second storage processor 330 for the prepossesses of synchronizing the operation of different processes or threads that are executed on the second storage processor 330. Unlike shared locks, none of these locks may be accessible to storage processors other than the second storage processor 330. In some implementations, transferring ownership of the given storage object 112 to the first storage processor 330 may include modifying the ownership attribute 220 of a local copy of the given storage object 112 that is maintained at the second storage processor 330 and transmitting a change-of-ownership message to each of the remaining storage processors 330. The change-of-ownership message may instruct the storage processors 330 to change the respective ownership attribute 220 of their local copies (of the given storage object 112) to indicate that first storage processor 330 is now the owner of the given storage object 112. Upon receiving the change-of-ownership message, each of the storage processors 330 may modify the ownership attribute 220 of its local copy accordingly. In some implementations, the change-of-ownership message may include an identifier of the given storage object 112 and an identifier of the new owner of the given storage object 112 (i.e., the first storage processor 330). In some implementations, before executing step 508, the first storage processor 330 may wait until it has received a change-of-ownership message that identifies the first storage processor 330 as the new owner of the given storage object 112.

According to the example of FIGS. 5A-B, storage system 110 adjusts transparently to the map used by the smart routing protocol (that is utilized by the host devices 130) by changing ownership of any of the storage objects 112 when an I/O request is received for the storage object at a storage processor that is not the current owner of the storage object. However, it will be understood that alternative implementations are possible in which the map used by the smart muting protocol is generated based on an ownership list that is provided to the host devices by the storage object manager 320. As the name suggests, the ownership list may identify the respective owner of each of the storage object 112 in the storage system 110.

FIGS. 6A-B provide an example of a protocol for cooperatively setting a lock on an entity that is associated with a storage object, as specified by step 410 of the process 400. Shown in FIG. 6A is a process 600A that is performed by the first storage processor 330 for the purposes of setting a lock on the entity identified at step 404. Shown in FIG. 6B is a process 600B that is performed by the storage object manager 320 for the purposes of setting a lock on the entity identified at step 404. According to the present example, the processes 600A and 600B are executed (at least in part) concurrently with one another.

Turning to process 600A, at step 602, the first storage processor 330 transmits a request to the storage object manager 320 to transfer ownership of the given storage object 112 to the first storage processor 330. At step 604, the first storage processor 330 waits until ownership of the given storage object 112 has been transferred to the first storage processor 330. At step 606, after ownership of the given storage object 112 has been transferred to the first storage processor 330, the first storage processor 330 sets a lock on the entity identified at step 404.

Turning to process 600B, at step 612, the object manager 320 receives from the first storage processor 330 a request to transfer ownership of the given storage object 112 to the first storage processor 330. At step 614, the object manager 320 detects that the second storage processor 330 is the current owner of the given storage object 112. In some implementations, the storage object manager 320 may detect that the second storage processor 330 is the current owner of the given storage object 112 by retrieving and examining the ownership attribute 220 of the given storage object 112. At step 616, the storage object manager 320 transmits to the second storage processor 330 a request to relinquish ownership of the given storage object. At step 618, the storage object manager 320 waits until the second storage processor 330 has relinquished ownership of the given storage object 112. At step 620, the storage object manager 320 transfers ownership of the given storage object 112 to the first storage processor 330.

In some implementations, in response to receiving the request to relinquish ownership of the given storage object 112, the second storage processor 330 may: (i) identify a plurality of locks associated with the storage object, (ii) wait until all of the locks have been released, (iii) stop all further access to the given storage object 112 by processes running on the second storage processor 330, and (iv) transmit to the storage object manager 320 an indication that ownership of the given storage object 112 has been relinquished. In response to receiving the indication, the storage object manager 320 may transmit a change-of-owner message to each of the plurality of storage processors 330 that identifies the first storage processor 330 as the new owner of the given storage object 112. Upon receiving the change-of-ownership message, each of the storage processors 330 may modify the ownership attribute 220 of its local copy (of the given storage object 112) accordingly. In some implementations, before executing step 606, the first storage processor 330 may wait until it has received a change-of-ownership message that identifies the first storage processor 330 as the new owner of the given storage object 112.

FIGS. 7A-B provide an example of a protocol for cooperatively setting a lock on an entity that is associated with a storage object, as specified by step 410 of the process 400. Shown in FIG. 7A is a process 700A that is performed by the first storage processor 330 for the purposes of executing the I/O request. Shown in FIG. 7B is a process 700B that is performed by the second storage processor 330 for the purposes of setting a lock on the entity identified at step 404. According to the present example, the processes 700A and 700B are executed (at least in part) concurrently with one another.

Turning to process 700A, at step 702, the first storage processor 330 detects that the second storage processor 330 is the current owner of the given storage object. In some implementations, the first storage processor 330 may detect that the second storage processor 330 is the current owner of the given storage object 112 by retrieving and examining the ownership attribute 220 of the given storage object 112. At step 704, the first storage processor 330 transmits a request to the second storage processor 330 to set a lock on the entity identified at step 404. At step 706, the first storage processor 330 waits until it has received an acknowledgment from the second storage processor 330 that the lock has been set, after which the first storage processor 330 proceeds to execute step 412 of the process 400.

Turning to process 700B, at step 722, the second storage processor 330 instantiates a pool of locks (also referred to as "partial locks") that corresponds to the given storage object 112. Each lock in the pool may be associated with the given storage object 112. For example, when the given storage object is a volume or a logical unit, each lock in the pool may be associated with a different metadata page that is referenced (directly or indirectly) by the given storage object 112. As another, when the given storage object is a volume or a logical unit, each lock in the pool may be associated with a different LBA in the given storage object 112. As another, when the given storage object is a file system, each lock in the pool may be associated with a different file. At step 724, the second storage processor 330 receives, from the first storage processor, a request to set a lock on the entity that is identified at step 404. At step 726, the second storage processor 330 identifies a lock from the pool that is associated with the entity and sets the identified lock. At step 728, the second storage processor 330 transmits to the first storage processor 330 an indication that the lock has been set. In some implementations, after the lock has been set and the I/O request executed, the second storage processor 330 may receive from the first storage processor 330 a request to release the lock. In response to the request to release the lock, the second storage processor 330 may release the lock, accordingly.

FIGS. 1-7B are provided as an example only. At least some of the steps discussed with respect to FIGS. 1-7B may be performed in a different order, performed concurrently, and/or altogether omitted. Although in the example of FIGS. 1-7B each of the storage processors 330 is a separate computing device, alternative implementations are possible in which two or more of the storage processors 330 are virtual storage processors. In such implementations, multiple virtual storage processors may be executed on the same computing device. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system having a plurality of storage processors, the method comprising:
   receiving, at a first storage processor in the plurality, an Input/Output (I/O) request that is associated with a storage object, the I/O request being routed to the first storage processor by a host device or a frontend of the storage system, the I/O request being routed to the first storage processor in accordance with a routing protocol that is configured to give preference to an owner of the storage object;
   identifying an entity associated with the I/O request and the storage object, the entity including only a portion of the storage object;
   detecting, by the first storage processor, whether the first storage processor is a current owner of the storage object;
   when the first storage processor is the current owner of the storage object, setting, by the first storage processor, a lock on the entity;
   when the first storage processor is not the current owner of the storage object, transmitting, by the first storage processor, a request to transfer ownership of the storage object to the first storage processor, and setting, by the first storage processor, the lock on the entity after the ownership of the storage object has been transferred to the first storage processor; and
   executing the I/O request, by using the entity, after the lock has been set,
   wherein the lock includes a local lock that is set and released only by the owner of the storage object, such that using the local lock in conjunction with the routing protocol results in a reduction of inter-processor network traffic that is associated with setting a lock on the entity.

2. The method of claim 1, wherein:
   the routing protocol is executed by the host device or frontend based on an ownership list that identifies a respective owner of each of a plurality of storage objects in the storage system, the ownership list being maintained by an object manager, and the request transfer ownership of the storage object is transmitted to the object manager, the object manager being configured to interact with the current owner of the storage object to effectuate a transfer of ownership of the storage object to the first storage processor.

3. The method of claim 1, wherein the ownership of the storage object is transferred from a second storage processor to the first storage processor.

4. The method of claim 1, wherein transferring ownership of the storage object to the first storage processor includes updating an ownership attribute in a plurality of copies of a storage volume, each of the plurality of copies being hosted at a different one of the plurality of storage processors.

5. The method of claim 1, wherein the I/O request includes a write request, and executing the I/O request by using the entity includes identifying a physical address associated with the entity and writing data associated with the I/O request to the physical address.

6. The method of claim 1, wherein the I/O request includes a read request and executing the I/O request by using the entity includes identifying a physical address associated with the entity and reading data from the physical address.

7. The method of claim 1, wherein the storage system is configured to enforce a policy that permits only the current owner of the storage object to set a lock on the entity.

8. A storage processor for use in a storage system, the storage processor comprising:
   a memory; and
   a processing circuitry, operatively coupled to the memory, the processing circuitry being configured to perform the operations of:
   receiving an Input/Output (I/O) request that is associated with a storage object, the I/O request being routed to the storage processor by a host device or a frontend of the storage system, the I/O request being routed to the storage processor in accordance with a routing protocol that is configured to give preference to an owner of the storage object;
   identifying an entity associated with the I/O request and the storage object, the entity including a only portion of the storage object;
   detecting whether the storage processor is a current owner of the storage object;
   when the storage processor is the current owner of the storage object, setting a lock on the entity;
   when the storage processor is not the current owner of the storage object, transmitting a request to transfer ownership of the storage object to the storage processor, and setting the lock on the entity after the ownership of the storage object has been transferred to the storage processor; and
   executing the I/O request by using the entity after the lock has been set,
   wherein the lock includes a local lock that is set and released only by the owner of the storage object, such that using the local lock in conjunction with the routing protocol results in a reduction of inter-processor network traffic that is associated with setting a lock on the entity.

9. The storage processor of claim 8, wherein:
   the routing protocol is executed by the host device or frontend based on an ownership list that identifies a respective owner of each of a plurality of storage objects in the storage system, the ownership list being maintained by an object manager, and the request transfer ownership of the storage object is transmitted to the object manager, the object manager being configured to interact with the current owner of the storage object to effectuate a transfer of ownership of the storage object to the first storage processor.

10. The storage processor of claim 8, wherein the ownership of the storage object is transferred to the storage processor from another storage processor.

11. The storage processor of claim 8, wherein transferring ownership of the storage object of the storage object includes updating an ownership attribute in a plurality of copies of a storage volume, each of the plurality of copies being hosted at a different one of a plurality of storage processors.

12. The storage system of claim 8, wherein the I/O request includes a write request and executing the I/O request by using the entity includes identifying a physical address associated with the entity and writing data associated with the I/O request to the physical address.

13. The storage system of claim 8, wherein the I/O request includes a read request and executing the I/O request by using the entity includes identifying a physical address associated with the entity and reading data from the physical address.

14. The storage system of claim 8, wherein the storage system is configured to enforce a policy that permits only the current owner of the storage object to set a lock on the entity.

15. A non-transitory computer-readable medium storing one or more processor-executable instructions, which, when executed by a processing circuitry of a first storage processor in a storage system, cause the processing circuitry to perform the operations of:
  receiving, by the first storage processor, an Input/Output (I/O) request that is associated with a storage object, the I/O request being routed to the first storage processor by a host device or a frontend of the storage system, the I/O request being routed to the first storage processor in accordance with a routing protocol that is configured to give preference to an owner of the storage object;
  identifying an entity associated with the I/O request, the entity including a only portion of the storage object;
  detecting, by the first storage processor, whether the first storage processor is a current owner of the storage object;
  when the first storage processor is the current owner of the storage object, setting, by the first storage processor, a lock on the entity;
  when the first storage processor is not the current owner of the storage object, transmitting, by the first storage processor, a request to transfer ownership of the storage object to the first storage processor, and setting, by the first storage processor, the lock on the entity after the ownership of the storage object has been transferred to the first storage processor; and
  executing the I/O request by using the entity after the lock on the entity has been set,
  wherein the lock includes a local lock that is set and released only by the owner of the storage object, such that using the local lock in conjunction with the routing protocol results in a reduction of inter-processor network traffic that is associated with setting a lock on the entity.

16. The non-transitory computer-readable medium of claim 15, wherein:
  the routing protocol is executed by the host device or frontend based on an ownership list that identifies a respective owner of each of a plurality of storage objects in the storage system, the ownership list being maintained by an object manager, and
  the request to transfer ownership of the storage object is transmitted to the object manager, the object manager being configured to interact with the current owner of the storage object to effectuate a transfer of ownership of the storage object to the first storage processor.

17. The non-transitory computer-readable medium of claim 15, wherein the ownership of the storage object is transferred from a second storage processor to the first storage processor.

18. The non-transitory computer-readable medium of claim 15, wherein transferring ownership of the storage object to the first storage processor includes updating an ownership attribute in a plurality of copies of a storage volume, each of the plurality of copies being hosted at a different one of a plurality of storage processors.

19. The non-transitory computer-readable medium of claim 15, wherein the I/O request includes a write request and executing the I/O request by using the entity includes identifying a physical address associated with the entity and writing data associated with the I/O request to the physical address.

20. The non-transitory computer-readable medium of claim 15, wherein the I/O request includes a read request and executing the I/O request by using the entity includes identifying a physical address associated with the entity and reading data from the physical address.

* * * * *